(12) United States Patent
Oliver

(10) Patent No.: US 9,197,841 B2
(45) Date of Patent: Nov. 24, 2015

(54) MANUAL DVR CONFLICT RESOLUTION

(71) Applicant: Verizon Patent and Licensing Inc., Basking Ridge, NJ (US)

(72) Inventor: Michael R. Oliver, Wayne, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 51 days.

(21) Appl. No.: 14/013,441

(22) Filed: Aug. 29, 2013

(65) Prior Publication Data

US 2015/0063788 A1 Mar. 5, 2015

(51) Int. Cl.
| | |
|---|---|
| *H04N 5/76* | (2006.01) |
| *H04N 21/433* | (2011.01) |
| *H04N 21/472* | (2011.01) |
| *H04N 5/782* | (2006.01) |

(52) U.S. Cl.
CPC .................. *H04N 5/76* (2013.01); *H04N 5/782* (2013.01); *H04N 21/4334* (2013.01); *H04N 21/47214* (2013.01)

(58) Field of Classification Search
None
See application file for complete search history.

(56) References Cited

U.S. PATENT DOCUMENTS

| | | | | |
|---|---|---|---|---|
| 2006/0268099 A1* | 11/2006 | Potrebic et al. | ............ | 348/14.01 |
| 2011/0194840 A1* | 8/2011 | Alexander | .................... | 386/293 |
| 2014/0355963 A1* | 12/2014 | Babu | ............................ | 386/292 |

* cited by examiner

*Primary Examiner* — Heather Jones

(57) ABSTRACT

A method includes identifying a scheduled video program recording conflict between video programs. The video programs are scheduled to be recorded at a same time. The method also includes determining whether there is at least one alternative recording opportunity for one of the video programs. The method includes determining a conflict status of a video program slot based on whether there is at least one alternative recording opportunity for the one of the video programs. The conflict status provides information applicable to determining a resolution of digital video recorder (DVR) scheduling for the video programs. The conflict status identifiers are provided to video program slots based on the conflict status of the video program slots. The method includes providing an option to manually resolve the scheduled video program recording conflict based on the conflict status identifiers, and resolving the scheduled video program recording conflict based on manual input.

20 Claims, 10 Drawing Sheets

| | 8:00 | 8:30 | 9:00 | 9:30 | 10:00 |
|---|---|---|---|---|---|
| CBS 610-a | VIDEO PROGRAM 620-1 | VIDEO PROGRAM 620-9 | VIDEO PROGRAM 620-17 | VIDEO PROGRAM 620-25 | VIDEO PROGRAM 620-33 |
| NBC 610-b | VIDEO PROGRAM 620-2 | VIDEO PROGRAM 620-10 | VIDEO PROGRAM 620-18 | VIDEO PROGRAM 620-26 | VIDEO PROGRAM 620-34 |
| FOX 610-c | VIDEO PROGRAM 620-3 | VIDEO PROGRAM 620-11 | VIDEO PROGRAM 620-19 | VIDEO PROGRAM 620-27 | VIDEO PROGRAM 620-35 |
| ANIMAL 610-f | VIDEO PROGRAM 620-6 | VIDEO PROGRAM 620-14 | VIDEO PROGRAM 620-22 | VIDEO PROGRAM 620-30 | VIDEO PROGRAM 620-38 |
| DISC 610-g | VIDEO PROGRAM 620-7 | VIDEO PROGRAM 620-15 | VIDEO PROGRAM 620-15 | VIDEO PROGRAM 620-31 | VIDEO PROGRAM 620-7 |
| HIST 610-h | VIDEO PROGRAM 620-8 | VIDEO PROGRAM 620-16 | VIDEO PROGRAM 620-16 | VIDEO PROGRAM 620-32 | VIDEO PROGRAM 620-8 |

FIG. 8B

MANUAL DVR CONFLICT RESOLUTION

BACKGROUND INFORMATION

Set top boxes may include tuners that receive audio visual feeds from a video service provider and digital video recorders (DVRs) that record the audio visual feeds. A conflict may arise when the users of a set top box schedule the DVR to record more video programs than there are available DVRs and/or tuners. Set top boxes are known to implement DVR conflict resolution methods that require the user's input to select the best choice between conflicting programs when a tuner conflict occurs. Today's DVR conflict resolution methods typically wait for the user input to select between the conflicting programs to resolve the conflict at a time of recording and, in the absence of user input, resolves the conflict based on a default schedule.

BRIEF DESCRIPTION OF THE DRAWINGS

FIGS. 8A and 8B illustrate machine guided conflict resolution scenarios on the exemplary user interface of FIG. 7.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein relate to devices, methods, and systems for implementing machine guided manual DVR conflict resolution. Manual DVR conflict resolution may include DVR conflict resolution (i.e., resolution of scheduled video program recording conflicts) that is based on direct user input to resolve particular instances of scheduled video program recording conflicts. In implementations described herein, a conflict status may be determined for each airing of a particular video program. The conflict status may provide information that a user may use in determining a resolution of DVR scheduling for conflicting video programs. For example, different conflict status may indicate that there are alternative recording opportunities (i.e., a video program is scheduled to be aired at a different time) for conflicting video programs, that there are no alternative recording opportunities for conflicting video programs, that an alternative recording opportunity may conflict with the scheduled video program recording or indicate the alternative recording opportunities for a video program currently in conflict. The systems and methods may provide a visual guide in a user interface of a display device to assist the user in resolving DVR conflicts based on the conflict status of different scheduled airings of video programs.

Consistent with the embodiments described herein, the systems and methods may enable the user to interact with graphical elements depicting scheduled DVR recordings in resolving DVR conflicts. For example, the system may enable the user to shift graphic elements depicting scheduled DVR recordings from a scheduled conflict to an alternative recording opportunity. In some implementations, the systems may also depict a chain reaction of DVR scheduling conflicts based on different DVR scheduling choices.

Consistent with further embodiments described herein, the systems and methods may determine a pattern of DVR conflict resolution associated with a user and extrapolate the choices to expedite or supplement the user's manual DVR conflict resolution process.

Figure 1:
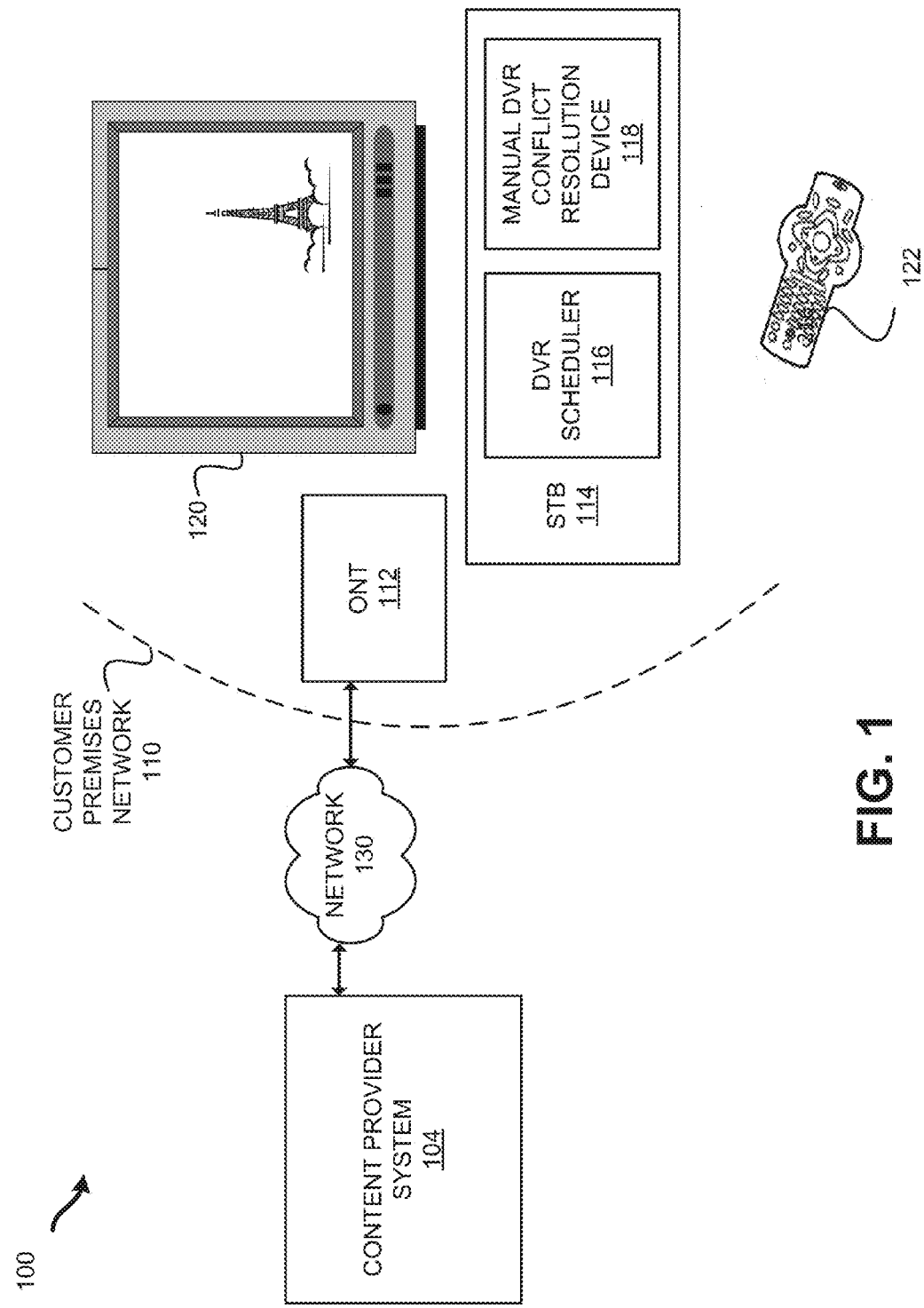
FIG. 1 illustrates an exemplary network in which systems and methods described herein may be implemented.

FIG. 1 is a diagram of an exemplary network 100 in which systems and/or methods described herein may be implemented. As illustrated, network 100 may include a content provider system 104 and a customer premises network 110. Customer premises network 110 (e.g., the customer's home) may include an optical network terminal (ONT) 112, a set-top box (STB) 114, a TV 120, and a remote control 122. STB 114 may include a DVR scheduler 116 and a manual DVR conflict resolution device 118. Content provider system 104 and customer premises network 110 may be interconnected by network 130. Components of network 100 may be interconnected via wired and/or wireless connections. The configuration of components of network 100 illustrated in FIG. 1 is for illustrative purposes only. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

Content provider system 104 may collect, generate, and provide video content to subscribers/recipients of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Content provider system 104 may provide media content to customer premises network 110. Additionally, content provider system 104 may provide metadata associated with the media content. According to one embodiment, content provider system 104 provides scheduled media content on a subscription and/or pay per view basis. Content provider system 104 may provide the video programs (e.g., to customer premises network 110) based on input received via STBs 114.

Customer premises network 110 may include a subscriber home that receives video content from a provider network (not shown).

ONT 112 may receive data, e.g., on a fiber optic cable, and may transfer the data to the appropriate device in customer premises network 110, such as STB 114. Likewise, ONT 112 may receive data from any device in customer premises network 110 and may transmit the data to other devices in customer premises network 110, e.g., through a fiber optic cable. ONT 112 may provide customer premises network 110 with television access, Internet access, or telephone service, for example. Additionally, ONT 112 may output data to provider network 120 through network 130.

STB 114 may receive video content and output the video content to TV 120 for display. STB 114 may include a component (e.g., a cable card or a software application) that plugs into a host device (e.g., a personal computer, TV 120, a stereo system, etc.) that allows the host device to display video content. STB 114 may also be implemented as a home theater personal computer (HTPC), an optical disk player (e.g., digital video disk (DVD) or Blu-Ray™ disc player), a cable card, etc. STB 114 may receive commands from other devices in network 100, such as remote control 122. In one embodiment, STB 114 may also include a microphone and/or a camera.

DVR scheduler 116 may implement DVR scheduling for STB 114, including determining times when channels at which video programs are broadcast are to be recorded. The video programs to be recorded may be selected by the user based on individual programs or episodes of a scheduled series or other preferences selected by the user. DVR scheduler 116 may identify multiple programs to be recorded based on instructions input by the user (e.g., via remote control 122. DVR scheduler 116 may determine that more video programs are to be recorded at a particular time than there are tuners available and generate a conflicting DVR schedule indication. DVR scheduler 116 may transmit the conflicting DVR schedule indication to manual DVR conflict resolution device 118.

Manual DVR conflict resolution device 118 may receive a general video program schedule of video programs and an associated recording schedule of video programs that are scheduled to be recorded by tuners associated with (or embedded in) STB 114. Manual DVR conflict resolution device 118 may identify one or more DVR conflicts in a recording schedule associated with the user account, for example when DVR scheduler 116 schedules more video programs to be recorded at a particular time than there are available tuners associated with STB 114. In some implementations, manual DVR conflict resolution device 118 may receive a conflicting DVR schedule indicator from DVR scheduler 116. Conflicting DVR schedule indicator may indicate that a conflict will occur when a time arrives for at least one of the conflicting programs to be recorded. For example, conflicting DVR schedule indicator may indicate that a video program that begins at a particular time will overlap with another video program that begins in a second particular time.

Manual DVR conflict resolution device 118 may provide visual aids to visually depict conflict resolution possibilities. Manual DVR conflict resolution device 118 may assist and enable a user associated with STB 114 to perform manual resolution of DVR conflicts, as described below with respect to FIGS. 4, 5A-5D, 6, 7, 8A, 8B and 9. Manual DVR conflict resolution device 118 may show ripple effects of each conflict resolution decision. Manual DVR conflict resolution device 118 may also determine a pattern of manual conflict resolution and supplement or enhance the manual conflict resolution process by the user. In one implementation, manual DVR conflict resolution device 118 may be implemented/integrated within STB 114.

TV 120 may include speakers as well as display 104. TV 120 may play content, for example, received from STB 114. While some embodiments described below may use TV 120 to view content, other embodiments may use any device (e.g., a computer or a mobile phone) to display/provide content.

Remote control 122 may issue commands for controlling other electronic devices, such as TV 120 or STB 114. Remote control 122, in conjunction with STB 114, may allow a user to interact with an application running on STB 114. In some instances, other types of devices (e.g., a keyboard, mouse, mobile phone, etc.) may be used instead of remote control 122.

Network 130 may include a wired or wireless network. Network 130 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 130 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 130 may also include a wireless satellite network.

In implementations described herein, systems and methods may identify conflict status of video programs that are scheduled to be recorded at conflicting times. The systems may leverage touch screens and devices that allow for navigation methods (e.g., touch screens or mobile devices as a remote) to select and arrange scheduled DVR recordings times for different conflicting video programs on a DVR recording schedule, to resolve scheduled DVR conflicts. The systems and methods may visually depict a chain reaction effect of each conflict resolution on other scheduled DVR recordings.

Figure 2:
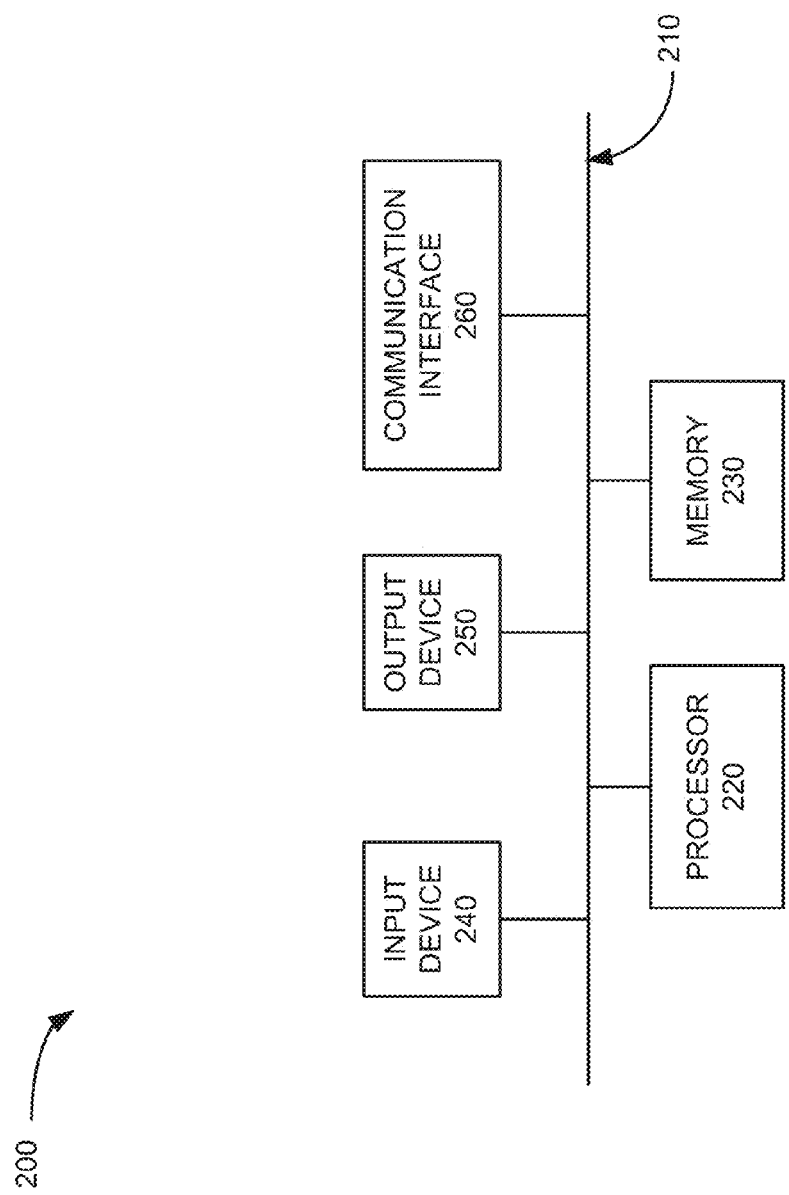
FIG. 2 is a block diagram of exemplary components of one or more of the devices of FIG. 1.

FIG. 2 is a diagram of exemplary components of a device 200. Each of content provider system 104, ONT 112, STB 114, manual DVR conflict resolution device 118, TV 120, or remote control 122 may include one or more devices 200. As shown in FIG. 2, device 200 may include a bus 210, a processor 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 3:
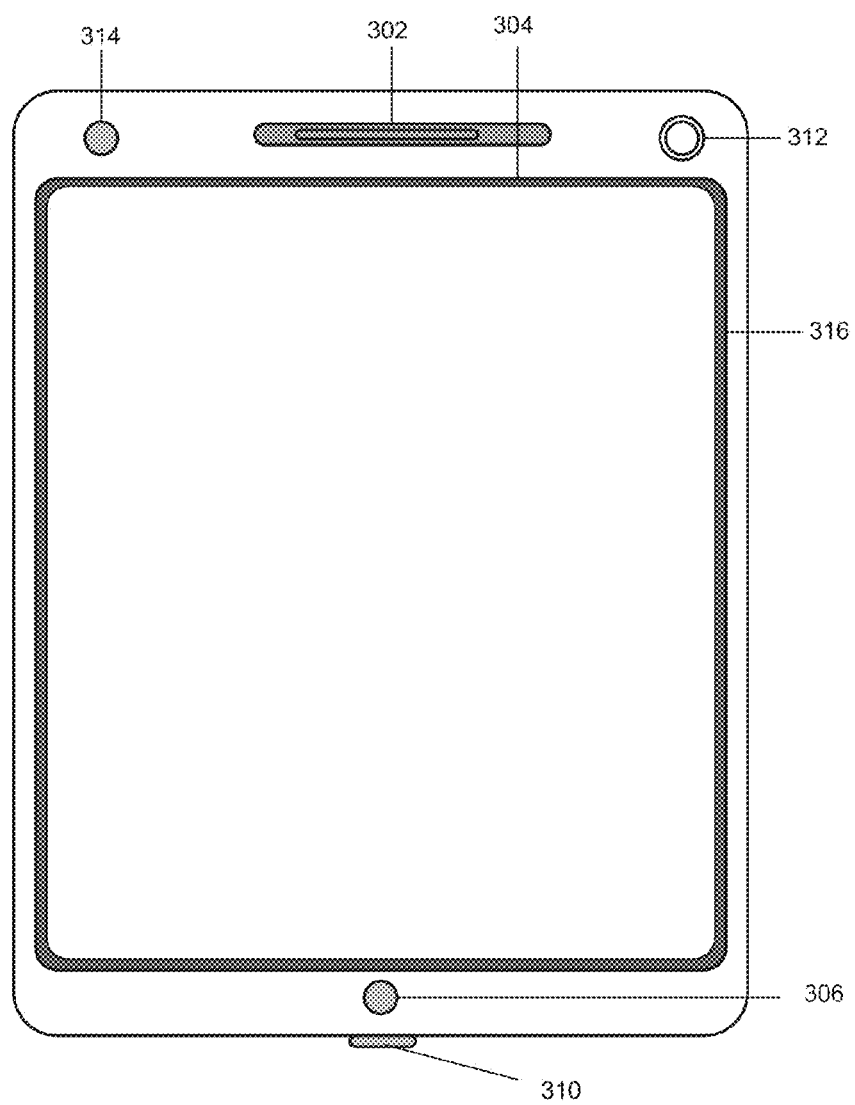
FIG. 3 is a diagram of an exemplary display device in which methods and systems described herein may be implemented.

FIG. 3 is a diagram of an exemplary device 300 in which methods and systems described herein may be implemented. Although illustrated as a tablet or touch screen device, device 300 may include any of the following devices: an electronic notepad, a tablet computer, a laptop, and/or a personal computer; a set top box; a gaming device or console; or another type of computational or communication device.

In this implementation, device 300 may take the form of a tablet computer. As shown in FIG. 3, device 300 may include a speaker 302, a touchscreen display 304, control button 306, a microphone 310, sensors 312, a front camera 314, and a housing 316. Speaker 302 may provide audible information to a user of device 300. Although device 300 is shown with particular components and a particular configuration, device 300 may include fewer, more or different components, such as additional sensors, input devices, and may include associated devices (e.g., a stylus) etc.

Display 304 may provide visual information to the user, such as an electronic program guide, video images, or pictures. In addition, display 304 may include a touchscreen for providing input to device 300. Display 304 may provide hardware/software to detect the coordinates of an area that is touched by a user. For example, display 304 may include a display panel, such as a liquid crystal display (LCD), organic light-emitting diode (OLED) display, and/or another type of display that is capable of providing images to a viewer. Display 304 may provide a user the capability to indicate graphic elements corresponding to scheduled DVR recordings and to move, delete, replace or swap graphic elements and the corresponding DVR recording times. Display 304 may include a transparent panel/surface for locating the position of a finger or an object (e.g., stylus) when the finger/object is touching or is close to display 304.

Control button 306 may permit the user to interact with device 300 to cause device 300 to perform one or more operations, such as place or receive a telephone call, input data to device 300, manipulate user interface elements, etc. In some implementations, control buttons 306 may include a telephone keypad (not shown) or an alphanumeric keyboard. Microphone 310 may receive audible information from the user. Sensors 312 may collect and provide, to device 300, information (e.g., acoustic, infrared, etc.) that is used to aid the user in capturing images or in providing other types of information (e.g., a distance between a user and device 300). Front camera 314 may enable a user to view, capture and store images (e.g., pictures, video clips) of a subject in front of device 300. Housing 316 may provide a casing for components of device 300 and may protect the components from outside elements.

Figure 4:
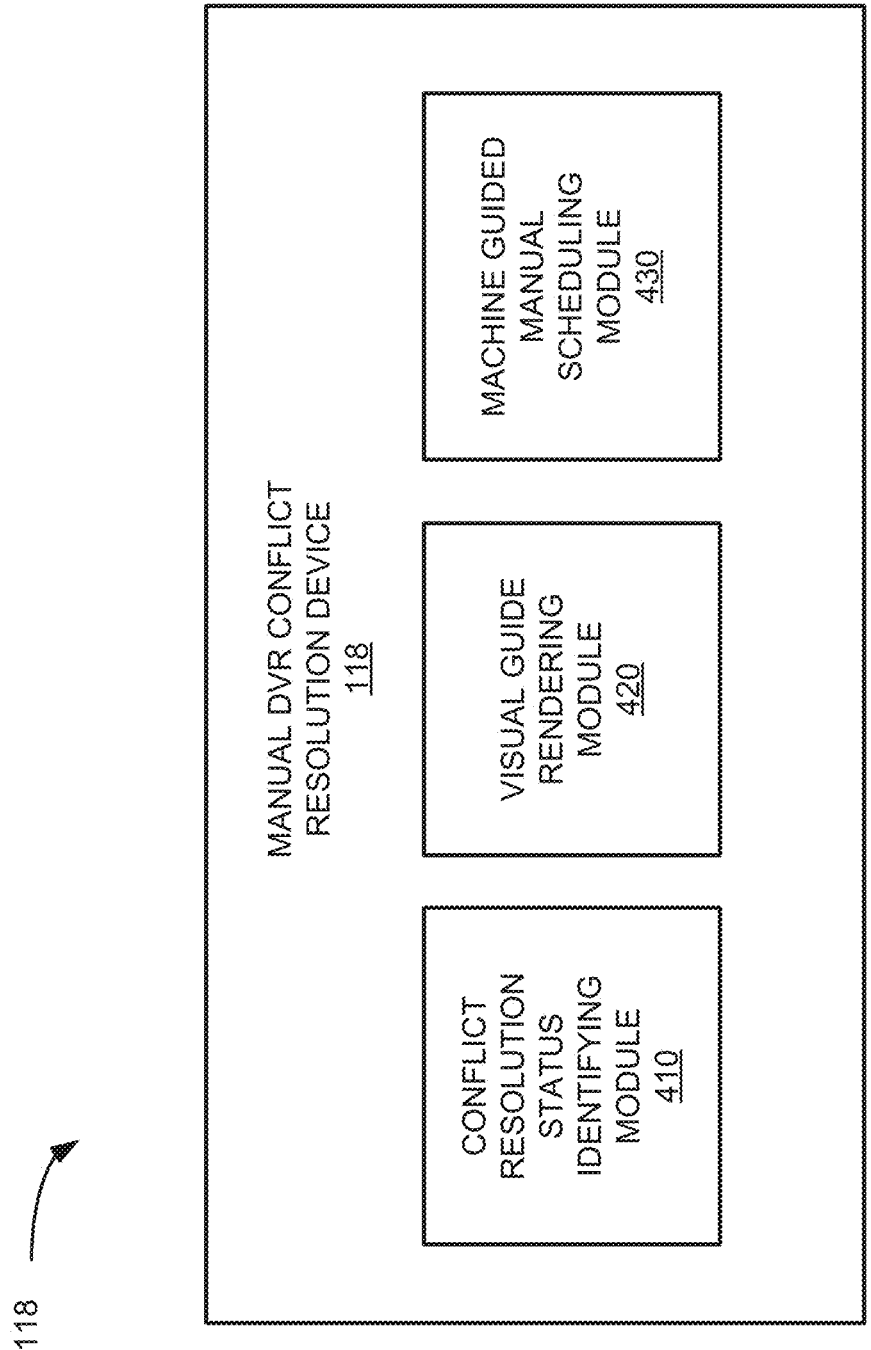
FIG. 4 is a functional block diagram of the manual DVR conflict resolution device of FIG. 1.

FIG. 4 illustrates an exemplary functional block diagram of manual DVR conflict resolution device 118. Device 118 may comprise software, hardware, or a combination of hardware and software. According to an embodiment, manual DVR conflict resolution device 118 may be a component of a set top box, such as STB 114 described above. As shown, manual DVR conflict resolution device 118 may include a conflict status identifying module 410, a visual guide rendering module 420 and a machine guided manual scheduling module 430. The configuration of components of manual DVR conflict resolution device 118 illustrated in FIG. 4 is for illustrative purposes only. Other configurations may be implemented. Therefore, manual DVR conflict resolution device 118 may include additional, fewer and/or different components than those depicted in FIG. 4. FIG. 4 is discussed in conjunction with FIGS. 5A-5D, which illustrate conflict status identifying icons 510-540.

Conflict status identifying module 410 may identify a conflicting airing of video programs. Conflict status identifying module 410 may determine whether there are alternative airings of the conflicting video programs. Conflict status identifying module 410 may determine a conflict status for each airing of conflicting video programs based on whether there are alternative airings of the conflicting video program. The conflict status may provide information that a user may use in determining a resolution of DVR scheduling for conflicting video programs. For example, a conflict status may indicate that there are alternative recording opportunities (i.e., the video program is scheduled to be aired at a different time) for conflicting video programs, that there are no alternative recording opportunities for conflicting video programs, that an alternative recording opportunity may conflict with the scheduled video program recording or that there are the alternative recording opportunities for a video program currently in conflict.

Visual guide rendering module 420 may assign conflict status identifying icons that may provide information that a user may use in determining a resolution of DVR scheduling for conflicting video programs. FIGS. 5A-5D illustrate exemplary conflict status identifying icons 510-540. Conflict status identifying icons 510-540 are graphic representations of video program recording opportunities, for each instance of conflicting video programs in a recording schedule and/or electronic program guide. Conflicting video programs are video programs that are scheduled to be recorded at a same time (or that are scheduled to overlap for recording times) at which there are less available DVR recording resources than a number of video programs. Each of the conflict status identifying icons may be differentiated from other conflict status identifying icons based on a shape, a color or other visual characteristics. The conflict status identifying icons 510-540 may be associated with a particular video program time slot in the electronic program guide. The video program time slot may be a visual representation of a particular program that is shown at a particular time on a particular channel in an electronic program guide or interface (e.g., video program slots are shown in and described with respect to FIGS. 6, 7, 8A and 8B). Visual guide rendering module 420 may integrate conflict status identifying icons 510-540 with other scheduling and recording iconography, such as described with respect to FIG. 6 below.

Figure 5B:
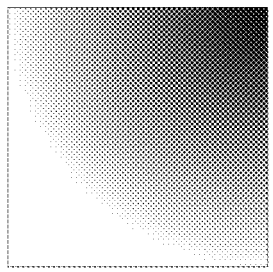
FIGS. 5A-5D are diagrams of exemplary conflict status identifying icons.
Figure 5D:
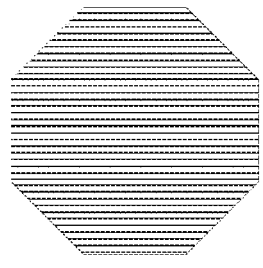
Figure 5A:
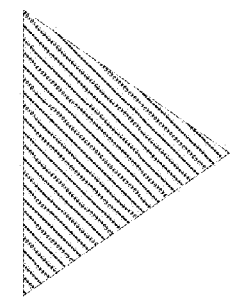

A non-alternative conflict status icon 510, as shown in FIG. 5A, may identify that an associated video program can only be recorded at a particular video program slot (i.e., an associated date and channel). The video program associated with non-alternative conflict status icon 510 cannot be (scheduled to be recorded at another time to resolve conflicts (i.e., the video program cannot be moved in the recording schedule), without losing the opportunity to record the video program. Non-alternative conflict status icon 510 may be assigned a particular shape, color or other visual characteristic that may be differentiated from other conflict status identifying icons, such as icons 520, 530 and 540. For example, non-alternative conflict status icon 510 may be depicted as an inverted triangle (and/or as a particular color, e.g., red) surrounding the video program that signifies to the user that the conflict cannot be resolved and the video program is not airing again during the guide's current view (e.g., within a two week span).

As shown in FIG. 5B, an alternative opportunity available conflict status icon 520 may indicate that an associated video program is airing again and can be recorded at another time (i.e., moved to in the recording schedule) to assist in resolving a conflict. For example, visual guide rendering module 420 may determine a particular icon (e.g., a square) to be positioned in association with the particular video program that is currently in conflict and whose recording can be rescheduled to assist in resolving the DVR conflict. In another example, visual guide rendering module 420 may determine alternative opportunity available conflict status icon 520 to be a square and/or blue color (e.g., surrounding an airing of the video program in the recording schedule or electronic program guide), which signifies that the video program is airing again (e.g., within the time span of the recording schedule or electronic program guide) and its recording may be rescheduled to assist in resolving a conflict.

Figure 5C:
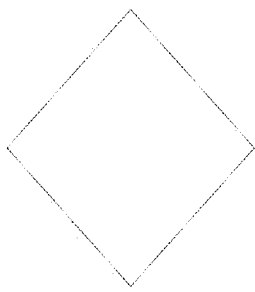

As shown in FIG. 5C, a potential conflict status icon 530 may identify that an associated video program may potentially be brought into conflict with a move of a scheduled recording of another video program (in the recording schedule or electronic program guide). For example, visual guide rendering module 420 may determine potential conflict status icon 530 to be a circle and/or a yellow color (surrounding or in a significant part of the video program slot), which signifies that the video program recording can potentially be brought into conflict with rescheduling of recording for another video program to a time that overlaps with the scheduled recording time for the video program.

As shown in FIG. 5D, an alternative conflict status icon 540 may identify that the indicated scheduled airing of a video program is an alternative to another scheduled airing of the video program that is in conflict. For example, visual guide rendering module 420 may determine alternative conflict status icon 540 to be a particular shape (e.g., a hexagon) and/or color (e.g., a green color in a significant area of the video program time slot), which signifies that the associated video program is another airing of a video program that is currently in conflict.

Referring back to FIG. 4, manual DVR conflict resolution device 118 may enable a user to reschedule recordings based on input provided to move graphic icons that represent the scheduled recordings in a graphic user interface of an associated device (i.e., the user may drag and drop scheduled recording icons) and adjust the schedule based on the moved icons, as described below with respect to FIGS. 6, 7, 8A and 8B. Manual DVR conflict resolution device 118 may leverage touch screens and other navigation methods (e.g., touch screens or mobile devices as a remote) to provide input to resolve conflicts based on conflict status identifying icons 510-540.

Figure 6:
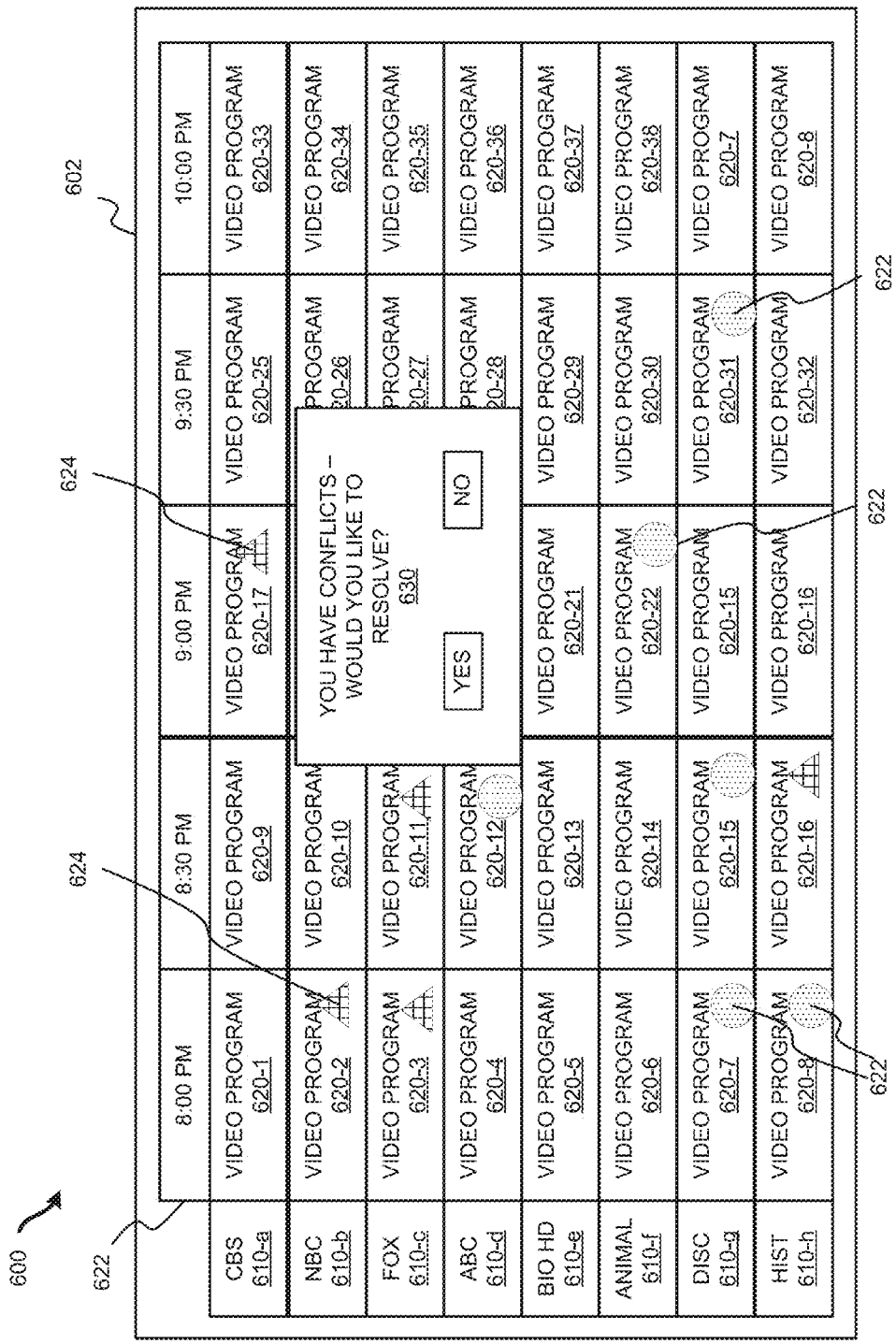
FIG. 6 is an exemplary user interface including a manual DVR conflict resolution message on a display associated with a STB.

FIG. 6 is an exemplary user display diagram 600 representing a user interface presented on a display associated with STB 114. As shown in FIG. 6, user display diagram may include a recording schedule 602 and a manual DVR conflict resolution message 620. Although a particular number of airings of video programs are shown in FIG. 6, and FIGS. 7 to 8B below, multiple options may be available for recording particular video programs. For example, a video program may be aired on similar channels (e.g., HBO East and HBO West) or on completely different channels. In those situations, a user display diagram may be expanded to present the additional recording options to the user.

Recording schedule 602 may include a listing of channels 610 (shown as 610-a to 610h, and illustrated, by way of example, as CBS 610-a, NBC 610-b, etc.) that scheduled video programs 620 (shown as video programs 620-1 to 620-38) may be received at scheduled times 612. Video programs scheduled to be broadcast are displayed in video program slots at particular times and particular channels. For example, as shown in FIG. 6, a video program 620-1 is scheduled to be broadcast on CBS 610-a at 8:00 PM. As shown in FIG. 6, a video program may be broadcast multiple times and therefore appear at different video program slots (e.g., video program 620-8 appears at the 8:00 PM video program slot on Hist 610-h and at the 10:00 PM slot on Hist-h.

Recording schedule 602 may indicate the scheduled recording status of various programs that the user has scheduled to be recorded. For example, the user may have input particular movies, programs, series or episodes, etc., to be recorded. However, in some instances a DVR conflict may arise where the user has scheduled more video programs to be recorded than there are available tuners. There are two tuners in this example. In other examples, there may be more or fewer available tuners. The video program listing that includes the accompanying circle 622 (which may be a red circle in some instances) indicate that the video program is scheduled to be recorded (e.g., video programs 620-7, 620-8, 620-12, etc., in FIG. 6). The video program listing that includes the accompanying triangle 624 (which may be a yellow triangle in some instances) may indicate that the video program was set to be recorded, but is not scheduled to be recorded due to conflict between the number of available tuners and the (larger) number of scheduled video programs at that particular time (e.g., video programs 620-2, 620-3, 620-11, etc., in FIG. 6).

Manual DVR conflict resolution device 118 may provide a manual DVR conflict resolution message 630 that includes an option (e.g., a prompt or link) for the user to manually resolve conflicts in the DVR recording schedule with the assistance of manual DVR conflict resolution device 118. Manual DVR conflict resolution device 118 may inform the user of existing conflicts and provide an opportunity for the user to resolve the conflicts. For example, manual DVR conflict resolution message 630 may be provided when the user accesses recording schedule 602. Manual DVR conflict resolution message 630 may inform the user of the DVR conflicts with a message, such as "You have conflicts—Would you like to resolve?" The message may include a link for the user to select "YES" or "NO" in response to the opportunity to resolve the DVR conflicts.

Figure 7:
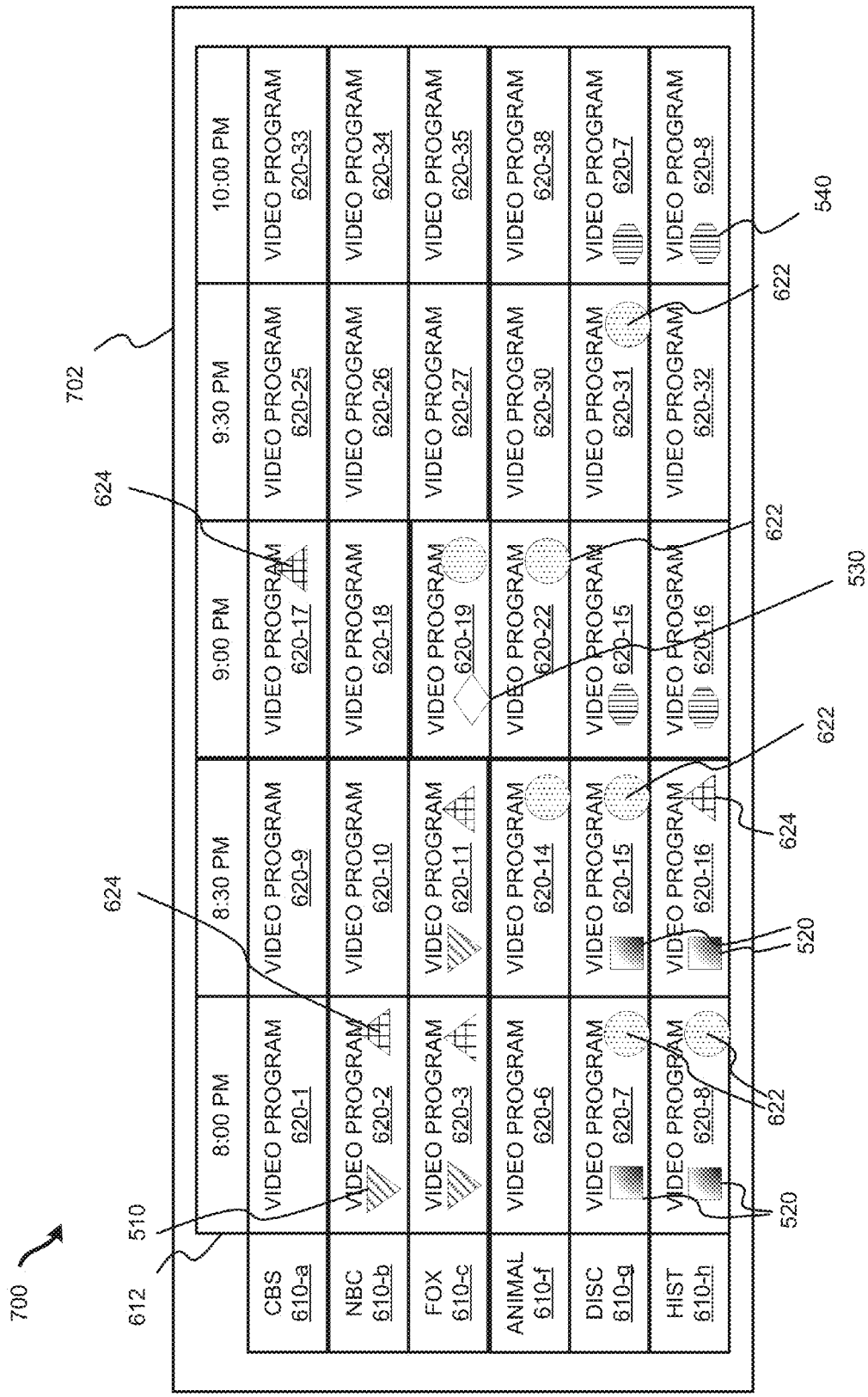
FIG. 7 is an exemplary user interface including a conflict recording schedule.

If the user clicks YES (i.e., selects to resolve the conflict(s)), manual DVR conflict resolution device 118 may provide an interactive interface that includes only the channels that have scheduled video programs, conflicting video programs and alternative airings of conflicting video programs as shown in FIG. 7.

FIG. 7 is an exemplary user display diagram 700 representing a user interface presented on a display associated with STB 114. As shown in FIG. 7, user display diagram may include a conflict recording schedule 702.

Manual DVR conflict resolution device 118 may provide conflict recording schedule 702 when the user selects to resolve DVR conflicts, for example by clicking "Yes" in response to manual DVR conflict resolution message 630 described with respect to FIG. 6 above. Conflict recording schedule 702 may be a reduced version of recording schedule 602 that may exclude channels that are not germane to DVR conflict resolution. Conflict recording schedule 702 may include a listing of channels 610 that include scheduled video programs 620 that are currently in conflict or may be used to resolve a DVR conflict. Channels that do not include at least one conflict status identifying icon may be excluded from conflict recording schedule 702 (e.g., channel 610-e, BIO HD is not included in conflict recording schedule 702). In addition, in some implementations (not shown), video program slots that are not relevant to DVR conflict resolution may be substantially reduced or removed (e.g., video program slots that do not include at least one conflict status identifying icon may be "grayed out" or otherwise made to provide a subdued visual effect in comparison to video program slots that include conflict status identifying icons).

Conflict status identifying icons 510-540, as described above with respect to FIGS. 5A to 5D may be positioned in at least one video program slot for each of the channels that are displayed by conflict recording schedule 702. Conflict status identifying icons 510-540 may indicate the conflict status of the associated video program slots. The conflict status in this instance provides information applicable to determining a resolution of DVR scheduling for the video programs based on the video program slot. As shown in FIG. 7, conflict status identifying icons (i.e., any of conflict status identifying icons 510-540) may be positioned on corresponding video program listings in conflict recording schedule 702. According to one embodiment, visual guide rendering module 420 may provide information that a user may use to identify properties that are associated with each of the conflict status identifying icons 510-540. For example, visual guide rendering module 420 may render an icon key (not shown) that includes information identifying properties of each of the conflict status identifying icons 510-540. Alternatively, visual guide rendering module 420 may provide a message that describes properties associated with the conflict status identifying icons when a cursor is placed in a predetermined proximity or on top of the particular conflict status identifying icons. For example, when a cursor is placed within the predetermined proximity of non-alternative conflict status icon 510, visual guide rendering module 420 may provide a message that states "this video program can only be recorded at this time and cannot be rescheduled."

Conflict recording schedule 702 may provide a contracted view of the video programs in an electronic program guide that only includes channels at which video programs that are currently scheduled to be recorded, are currently in conflict, or are alternatives to video programs that are already in conflict. Conflict recording schedule 702 may also provide a conflict status or an indication of what the user may do to resolve the DVR conflict based on the particular airing of a video program (or programs) by either iconography (e.g., such as conflict status identifying icons 510-540, described above with respect to FIGS. 5A to 5D) or color coded methods. Although the conflict status of video programs is illustrated using conflict status identifying icons 510-540 in FIGS. 7, 8A and 8B, in other embodiments color codes may be used to illustrate the different conflict resolution properties associated with the video program slots.

According to one implementation, visual guide rendering module 420 may provide a visual link between video program slots that are currently in conflict and video program slots that the scheduled recording of a video program may be rescheduled to in order to assist the DVR conflict resolution. Visual guide rendering module 420 may also provide a visual link between each video program and a corresponding alternative recording opportunity (or opportunities). For example, visual guide rendering module 420 may provide a line from the video program slot that is currently in conflict to the video program slot to which the scheduled recording may be moved. Alternatively, visual guide rendering module 420 may highlight the video program slots that a currently conflicting video program may be moved to when the user places a cursor (or touches or otherwise interacts with) the currently conflict video program slot.

Figure 8A:
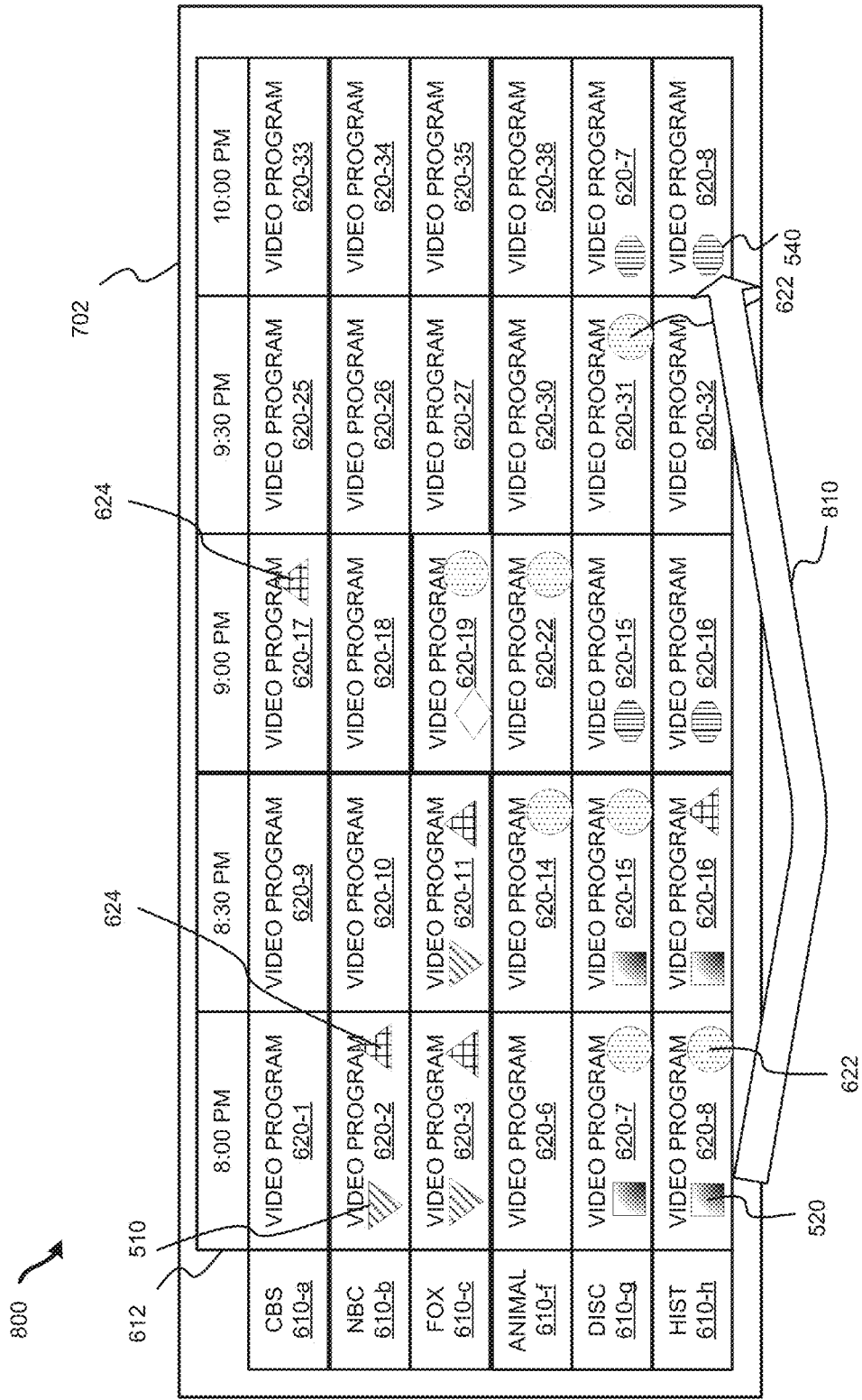

FIGS. 8A and 8B are exemplary user display diagrams 800 and 850, respectively, illustrating user interaction with a user interface presented on a display associated with STB 114. As shown in FIG. 8A, user display diagram may include a conflict recording schedule 702.

The user may interact with video programs slots in conflict recording schedule 702 to free the conflicts between scheduled video program recordings. For example, the user may provide an input (e.g., via a finger or stylus on device 300 or by a remote control signal) to move a scheduled recording (shown by arrow 810) from a particular video program slot to another video program slot at an associated display device to assist in DVR conflict resolution. Manual DVR conflict resolution device 118 may receive the physical input and reschedule the scheduled recording from a time corresponding to the particular video program slot to a time corresponding to another video program slot based on the physical input received at the associated display device. The user may drag scheduled recording for video programs around (e.g., by placing an instrument, such as a finger or stylus at the video program slot and moving the finger or stylus to the other alternative recording time or video program slot) to resolve program recording conflicts. In another example, the user may signal that a scheduled recording at a conflicting video program slot is to be moved by first tapping on the conflicted video program slot and then tapping on the alternative video program slot. The scheduled recording may then be transferred from the conflicted slot to the alternative video program slot. The user may select video program slots to transfer recordings based on the conflict status of the video programs, indicated, for example, by conflict status identifying icons 510-540.

According to an example, as shown in FIG. 8A, the user may drag the scheduled recording of video program 620-8 from the 8:00 PM time slot on Hist 610-h to the 10:00 PM time slot. As shown in FIG. 8B, moving the scheduled recording of video program 620-8 to the 10:00 PM time slot allows one of the DVR tuners to record a different video program that was previously in conflict (shown as video program 620-3) at the 8:00 PM time slot. The video program to be recorded at the newly opened time slot may be selected by the user or automatically selected based on a combination of previous scheduling or ranking of video programs to be recorded (e.g., video program 620-3 may be more highly ranked than video program 620-2 which was also scheduled to be recorded and in conflict at the 8:00 PM time slot).

In some scenarios, the user may bring non-conflict video programs into conflict. In this example, if the user moves video program 620-15 from the 8:30 PM time slot on Disc 610-g to the 9:00 PM time slot, video program 620-19 may be brought into conflict. This conflict resolution property of video program 620-19 is indicated by potential conflict status icon 530. The user may value some video programs more than others and choose to record some video programs before others or not record some video programs in order to resolve the DVR conflict.

According to one implementation, manual DVR conflict resolution device 118 may provide one or more prospective sets of conflict resolution that the user may select. For example, manual DVR conflict resolution device 118 may display a conflict recording schedule 702 with a particular combination of conflict scheduling choices for recording video programs (e.g., a particular combination of scheduled recordings at particular times). Manual DVR conflict resolution device 118 may provide the combination of conflict scheduling choices for recording video programs based on previous user selections. The user may provide an input to select that combination or reject the particular combination. In some implementations, the systems may also depict a chain reaction of DVR scheduling conflicts based on different DVR scheduling choices (i.e., manual DVR conflict resolution device 118 may provide a DVR recording schedule based on the user's initial conflict resolution choice). Manual DVR conflict resolution device 118 may provide additional combinations of conflict scheduling choices or allow the user to manually schedule video programs to be recorded on a program by program basis.

Referring to FIG. 8B, when the user is done and has completed the conflict resolution, manual DVR conflict resolution device 118 may offer the option for the user to go to the next period (e.g. a next day) of conflicts. When the user has completed the conflict resolution, the user may signal that the user is finished with the conflict resolution process (e.g., by hitting a "DONE" button (not shown)) and may be brought to another screen to deal with the other video programs in conflict that have not been scheduled.

Manual DVR conflict resolution device 118 may provide additional options for the user to deal with video programs that are currently conflicted and not scheduled to be recorded, such as a swap capability in which a conflicting video program that is not currently scheduled to be recorded is exchanged for a different program that is currently scheduled to be recorded. In some instances, manual DVR conflict resolution device 118 may identify that a resolution of the scheduled video program recording conflict requires that a particular video program be removed from a current recording schedule. Theses video programs may thereby become unscheduled for recording. Manual DVR conflict resolution device 118 may provide an "Add to Watch list" capability. The video programs that are unscheduled for recording may be moved to the watch list, which may be a list of video programs that manual DVR conflict resolution device 118 may search for in a later time (e.g. upcoming broadcast schedules) and provide notification to the user. In some implementations, video programs may also be automatically added to the recording schedule (or the user may select to add the video program to the recording schedule) when the video program appears in future broadcast schedules (i.e., a "record another day" option in which the video program is added to a list of video programs to be recorded on another day may be provided to the user).

According to one implementation, if a user takes no action on conflicts, the conflicting video programs may be automatically added to the watch list. Manual DVR conflict resolution device 118 may remove automatically added video programs from the watch list after a predetermined time (i.e., the video program watch "expires") if the user does not provide confirmation of the watch list status of the video program to ensure that the watch list is maintained with only items that the user would like to track.

After the conflicts have been resolved, the conflict recording schedule 702 may expand to a full recording schedule, for example such as recording schedule 602 shown in FIG. 6. Alternatively, the user may provide an input to exit to a selected video program.

Figure 9:
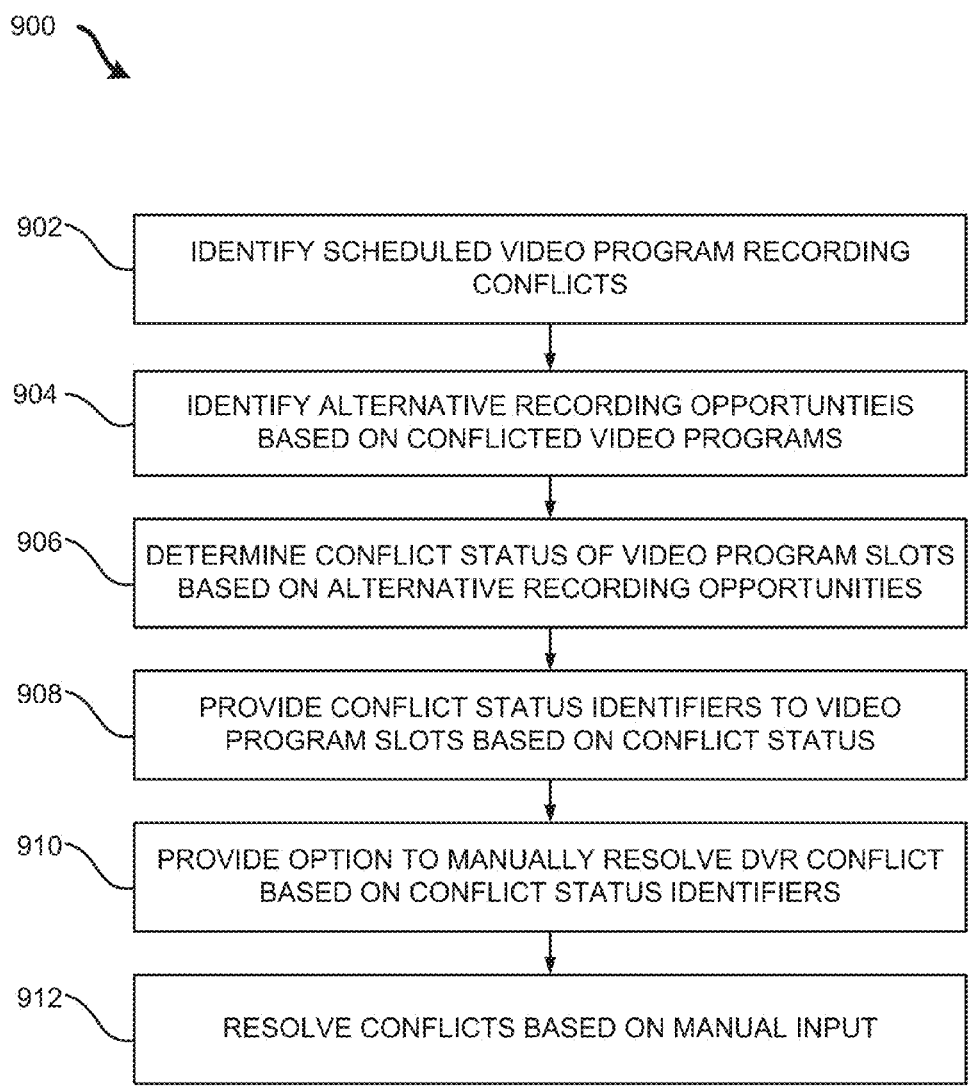
FIG. 9 is a flowchart of an exemplary process for implementing machine guided manual DVR conflict resolution according to an implementation described herein.

FIG. 9 is a flowchart of an exemplary process 900 for implementing machine guided manual DVR conflict resolution. Process 900 may execute in a device, for instance manual DVR conflict resolution device 118. In another implementation, some or all of process 800 may be performed by another device or group of devices, including or excluding manual DVR conflict resolution device 118. It should be apparent that the process discussed below with respect to FIG. 9 represents a generalized illustration and that other elements may be added to or existing elements may be removed from, modified or rearranged in process 900.

At block 902, manual DVR conflict resolution device 118 may identify scheduled video program recording conflicts. For example, manual DVR conflict resolution device 118 may receive a notification from DVR scheduler 116 that more video programs are scheduled to be recorded at a time than there are available tuners.

Manual DVR conflict resolution device 118 may identify alternative recording opportunities based on the conflicting video programs (block 904). For example, manual DVR conflict resolution device 118 may identify additional broadcast times for the video programs that are scheduled to be recorded at a time that conflicts with the scheduled recording times of other video programs.

According to one implementation, manual DVR conflict resolution device 118 may identify alternative recording opportunities based on a commercial free version of the video program (e.g., manual DVR conflict resolution device 118 may disregard a version of the video program that includes commercials as an alternative recording opportunity).

At block 906, manual DVR conflict resolution device 118 may determine a conflict status of video program slots in a recording schedule based on alternative recording opportunities. For example, if a particular video program is scheduled to be broadcast at a particular time and channel, manual DVR conflict resolution device 118 may search the broadcast schedule for additional times at which the video program is to be broadcast.

According to one implementation, manual DVR conflict resolution device 118 may search for on demand options for video programs that are scheduled to be recorded at conflicting times and provide this option to the user. In a further implementation, manual DVR conflict resolution device 118 may search for only free content to provide in this manner and notify the user of the option to view the scheduled recording on demand.

Manual DVR conflict resolution device 118 may provide conflict status identifiers to the video program slots based on the conflict status of each particular airing of the video program that is in conflict (block 908). For example, manual DVR conflict resolution device 118 may render conflict status identifying icons 510-540 to be displayed in conjunction with the video program slots for the scheduled conflicted recordings. In other implementations, manual DVR conflict resolution device 118 may use color coding, patterns r other visual signifiers to identify that particular conflict status is associated with particular video program slots. Manual DVR conflict resolution device 118 may provide the conflict status identifiers for scheduled conflicted recordings of the video programs as well as for alternative airings of the video programs.

At block 910, manual DVR conflict resolution device 118 may provide an option for the user to manually resolve DVR conflicts based on the conflict status identifiers. For example, manual DVR conflict resolution device 118 may provide a conflict recording schedule, such as conflict recording schedule 702 shown in FIG. 7 and described above, in a user interface of a device with which the user may interact.

Manual DVR conflict resolution device 118 may resolve the DVR conflicts based on manual input associated with the conflict status identifiers for the video program slots (block 812). For example, manual DVR conflict resolution device 118 may receive input from the user to move conflicting scheduled recordings to a video program slot for an alternative recording opportunity for that video program.

In some implementations, manual DVR conflict resolution device 118 may determine a pattern of DVR conflict resolution associated with the user and extrapolate the choices to supplement a manual DVR conflict resolution process associated with the user. Manual DVR conflict resolution device 118 may extrapolate, based on the user input, additional conflict resolution to supplement a manual DVR conflict resolution process associated with the user. The additional conflict resolution may be applied to current additional conflict resolution and/or future conflict resolution.

Systems and/or methods described herein may provide machine guided manual DVR conflict resolution. The system may determine conflict status identifiers based on alternative recording opportunities for conflicting video programs.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   identifying a scheduled video program recording conflict between video programs, wherein the video programs are scheduled to be recorded at a same time;
   determining whether there is at least one alternative recording opportunity for one of the video programs;
   determining, by a processor, a conflict status of at least one video program slot based on whether there is at least one alternative recording opportunity for the one of the video programs and the identified scheduled video program recording conflict at the at least one video program slot, wherein the conflict status provides information applicable to determining a resolution of digital video recorder (DVR) scheduling for the video programs by selecting the at least one video program slot;
   determining at least one conflict status identifier based on at least one of a color coded identification or iconography based on the conflict status of the at least one video program slot;
   providing the at least one conflict status identifier to the at least one video program slot based on the conflict status of the at least one video program slot;
   providing, by the processor, an option to manually resolve the scheduled video program recording conflict based on the at least one conflict status identifier; and
   resolving the scheduled video program recording conflict based on manual input.

2. The computer-implemented method of claim 1, wherein determining the conflict status of the at least one video program slot comprises:
   determining that the conflict status indicates that there is no alternative recording opportunity for the one of the video programs in a predetermined time; and
   providing the at least one conflict status identifier to the at least one video program slot to indicate that there is no alternative recording opportunity for the one of the video programs in the predetermined time.

3. The computer-implemented method of claim 1, wherein determining the conflict status of the at least one video program slot comprises:
   determining that the conflict status indicates that there are alternative recording opportunities for the video program in a predetermined time and
   providing the at least one conflict status identifier to the at least one video program slot to indicate that there are alternative recording opportunities for the video program in the predetermined time.

4. The computer-implemented method of claim 1, wherein determining the conflict status of the at least one video program slot comprises:
   determining that the conflict status indicates that the video program slot is at a same time as an alternative recording opportunity; and
   providing the at least one conflict status identifier to the at least one video program slot to indicate that the video program slot is at a same time as the alternative recording opportunity.

5. The computer-implemented method of claim 1, wherein determining the conflict status of the at least one video program slot comprises:
   determining that the conflict status indicates that the at least one video program slot corresponds to an alternative recording opportunity; and providing the at least one conflict status identifier to the at least one video program slot to indicate that the at least one video program slot corresponds to the alternative recording opportunity.

6. The computer-implemented method of claim 1, wherein resolving the conflict based on manual input comprises:
providing a DVR recording schedule based on the manual input.

7. The computer-implemented method of claim 1, further comprising:
providing a visual link between the one of the video programs and at least one corresponding alternative recording opportunity.

8. The computer-implemented method of claim 1, wherein resolving the scheduled video program recording conflict based on manual input comprises:
receiving a physical input, which indicates an action based on the at least one conflict status identifier, at an associated display device; and
rescheduling the recording to the at least one alternative recording opportunity based on the action indicated by the physical input received at the associated display device.

9. The computer-implemented method of claim 1, wherein resolving the scheduled video program recording conflict comprises:
identifying that a resolution of the scheduled video program recording conflict requires that a particular video program be removed from a recording schedule; and
adding the particular program to a watch list for video programs broadcast at a later time.

10. The computer-implemented method of claim 1, wherein resolving the scheduled video program recording conflict comprises:
identifying that a resolution of the scheduled video program recording conflict requires that a particular video program be removed from a recording schedule; and
adding the particular program to a list of video programs to be recorded on another day, for video programs broadcast at a later time.

11. The computer-implemented method of claim 1, further comprising:
swapping a particular conflicting video program scheduled to be recorded at a particular time for another conflicting video program.

12. The computer-implemented method of claim 1, further comprising:
determining a pattern of DVR conflict resolution associated with a user;
receiving a manual input from the user; and
extrapolating, based on the user input, additional conflict resolution to supplement a manual DVR conflict resolution process associated with the user.

13. The computer-implemented method of claim 1, further comprising:
signaling that a scheduled recording at a conflicting video program slot is to be moved to an alternative video program slot based on tapping on the conflicted video program slot on an interface of an associated display device; and
tapping on the alternative video program slot.

14. The computer-implemented method of claim 1, further comprising:
searching for at least one free on demand version of one of the video programs; and
providing an option to view the at least one free on demand version of the one of the video programs.

15. A device comprising:
a memory to store a plurality of instructions; and
a processor configured to execute instructions in the memory to:
identify a scheduled video program recording conflict between video programs, wherein the video programs are scheduled to be recorded at a same time;
determine whether there is at least one alternative recording opportunity for one of the video programs;
determine a conflict status of at least one video program slot based on whether there is at least one alternative recording opportunity for the one of the video programs and the identified scheduled video program recording conflict at the at least one video program slot, wherein the conflict status provides information applicable to determining a resolution of digital video recorder (DVR) scheduling for the video programs by selecting the at least one video program slot;
determine at least one conflict status identifier that includes at least one of a color coded identification or iconography based on the conflict status of the at least one video program slot;
provide the at least one conflict status identifier to the at least one video program slot based on the conflict status of the at least one video program slot;
provide an option to manually resolve the scheduled video program recording conflict based on the at least one conflict status identifier; and
resolve the scheduled video program recording conflict based on manual input.

16. The device of claim 15, wherein the processor is further configured to:
determine that there is no alternative recording opportunity for the one of the video programs in a predetermined time; and
provide a non-alternative conflict status icon that identifies that the one of the video programs can only be recorded at a particular video program slot.

17. The device of claim 15, wherein the processor is further configured to:
determine that there are alternative recording opportunities for the video program in a predetermined time; and
provide an alternative opportunity available conflict status icon that identifies that the one of the video programs is airing again and recording of the one of the video programs can be rescheduled to assist in resolving a conflict.

18. The device of claim 15, wherein the processor is further configured to:
determine that the at least one video program slot is at a same time as an alternative recording opportunity; and
provide a potential conflict status icon that identifies that the one of the video programs can potentially be brought into conflict with rescheduling of another video program.

19. The device of claim 15, wherein the processor is further configured to identify alternative recording opportunities based on a commercial free version of the one of the video programs.

20. A non-transitory computer-readable medium including instructions to be executed by a processor, the instructions including one or more instructions, which when executed by the processor, for causing the processor to:
identify a scheduled video program recording conflict between video programs, wherein the video programs are scheduled to be recorded at a same time;

determine whether there is at least one alternative recording opportunity for one of the video programs;

determine a conflict status of at least one video program slot based on whether there is at least one alternative recording opportunity for the one of the video programs and the identified scheduled video program recording conflict at the at least one video program slot, wherein the conflict status provides information applicable to determining a resolution of digital video recorder (DVR) scheduling for the video programs by selecting the at least one video program slot;

determine at least one conflict status identifier that includes at least one of a color coded identification or iconography based on the conflict status of the at least one video program slot;

provide the at least one conflict status identifier to the at least one video program slot corresponding to the video programs based on the conflict status of the at least one video program slot;

provide an option to manually resolve the scheduled video program recording conflict based on the at least one conflict status identifier; and resolve the scheduled video program recording conflict based on manual input.

* * * * *